United States Patent [19]

Nickel et al.

[11] Patent Number: 4,635,777

[45] Date of Patent: Jan. 13, 1987

[54] CENTRIFUGAL CLUTCH

[75] Inventors: Hans Nickel, Cottenweiler; Michael Wissmann, Markgröningen, both of Fed. Rep. of Germany

[73] Assignee: Andreas Stihl, Waiblingen, Fed. Rep. of Germany

[21] Appl. No.: 722,080

[22] Filed: Apr. 11, 1985

[30] Foreign Application Priority Data

Apr. 17, 1984 [DE] Fed. Rep. of Germany ....... 3414406

[51] Int. Cl.$^4$ .................. F16D 43/18; F16D 13/18
[52] U.S. Cl. .................. 192/75; 192/105 CD
[58] Field of Search ........ 192/52, 75, 103 B, 105 CD, 192/105 CE; 188/184; 56/11.7, 11.8

[56] References Cited

U.S. PATENT DOCUMENTS

| | | | |
|---|---|---|---|
| 1,878,824 | 9/1932 | Dodge | 192/75 X |
| 1,983,661 | 12/1934 | Frantz et al. | 192/105 CD |
| 2,596,193 | 5/1952 | Zieg, Jr. | 192/75 X |
| 2,626,034 | 1/1953 | Fawick | 192/75 X |
| 3,224,541 | 12/1965 | Yamamoto | 192/105 CD |
| 3,954,162 | 5/1976 | Densow | 192/105 CE |
| 4,226,320 | 10/1980 | St. John | 192/105 CD |
| 4,282,962 | 8/1981 | St. John | 192/105 CD |
| 4,294,342 | 10/1981 | St. John | 192/105 CD |
| 4,296,852 | 10/1981 | Luerken | 192/105 CD X |
| 4,446,954 | 5/1984 | Weiss | 192/105 CD |

FOREIGN PATENT DOCUMENTS 7506785  6/1975  Fed. Rep. of Germany .
933615   8/1963  United Kingdom ........ 192/105 CD Primary Examiner—Rodney H. Bonck
Assistant Examiner—Richard M. Lorence
Attorney, Agent, or Firm—Walter Ottesen

[57] ABSTRACT

A centrifugal clutch has a carrier and at least two centrifugal weights which are each connected to the carrier by means of at least one spring. These centrifugal weights are pivotally mounted on the carrier and are preloaded radially inwardly with respect to the carrier by means of the springs. In this way, the centrifugal weights have a defined pivot axis so that they can pivotally move from their rest position to the coupling position when the rotational speed exceeds a predetermined speed above no-load speed. By preloading the centrifugal weights, the latter are prevented from pivoting outwardly at speeds below no-load speed so that the centrifugal weights do not strike the clutch drum at rotational speeds beneath a predetermined value.

21 Claims, 5 Drawing Figures

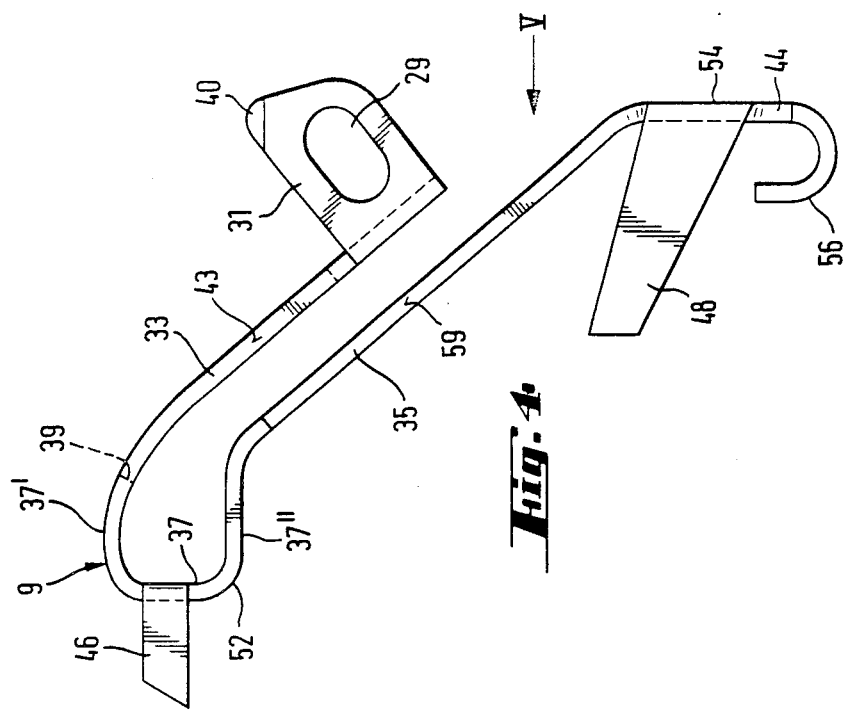
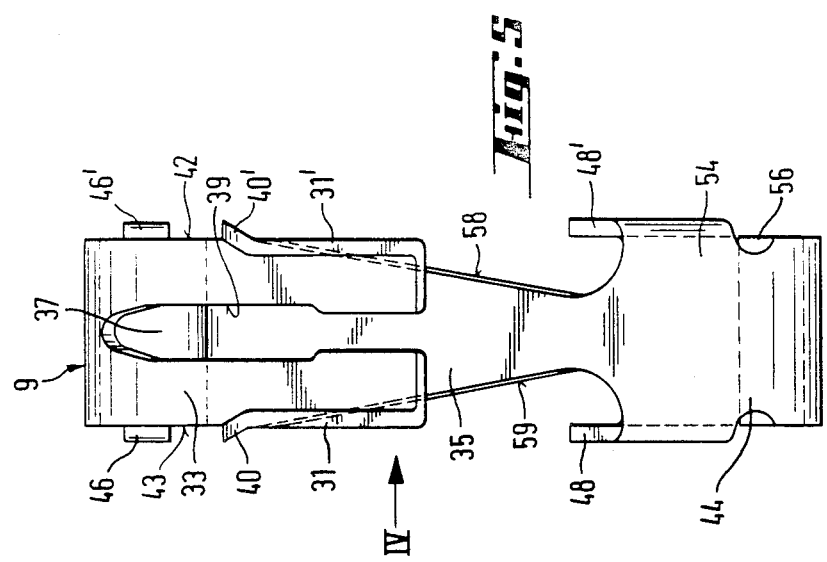

CENTRIFUGAL CLUTCH

FIELD OF THE INVENTION

The invention relates to a centrifugal clutch for hand-guided, portable, motor-driven apparatus including chain saws or the like. The centrifugal clutch includes a carrier adapted to be rotatably driven by the motor of the apparatus and a clutch drum is disposed in surrounding relationship to the carrier. At least two centrifugal weights are disposed within the clutch drum and are mounted on the carrier.

BACKGROUND OF THE INVENTION

German Utility Model Registration DE-GM No. 75 06 785 discloses a centrifugal clutch wherein the rotor of the clutch is configured in the form of a lamellar packet. The centrifugal weights, the springs and the carrier are configured in one piece as lamellae.

As a consequence of this one piece configuration, the springs cannot apply a biasing load to the centrifugal weights so that they move outwardly under the action of centrifugal force already when the no-load speed is reached. In order to prevent an impermissibly large deformation of the springs, the centrifugal weights are arranged to lie at a very small spacing from the inner wall of the clutch drum so that the springs are deformed by only a small quantity when the weights pivot outwardly.

As a consequence, small deviations or variations in the rotational speed cause the centrifugal weights to strike against the inner wall of the clutch drum even for low assembly tolerances and form deviations of the clutch drum or of the centrifugal weights. This unwanted contact engagement of the centrifugal weights with the clutch drum causes disturbing noises such as the so-called bell clang.

As a consequence of the one piece configuration, the centrifugal weights have no defined rotation or pivot axis so that no sensitive correlation between the rotational speed whereat the centrifugal weights should pivot outwardly and the opposing return force of the springs is possible.

SUMMARY OF THE INVENTION

It is an object of the invention to provide a centrifugal clutch wherein the centrifugal weights are very close to the clutch drum and held in a defined position without an unwanted contact between the clutch drum and the centrifugal weights while permitting the centrifugal weights to move outwardly at a predetermined rotational speed.

The centrifugal clutch of the invention is for hand-guided, portable motor-driven apparatus including chain saws or the like. The centrifugal clutch of the invention includes: a carrier adapted to be rotatably driven by the motor of the apparatus; a clutch drum disposed in surrounding relationship to the carrier; at least two centrifugal weights disposed within the clutch drum and mounted on the carrier; resilient means for resiliently biasing the weights radially inwardly toward the carrier so as to hold the same in a rest position whereat the weights are disengaged from the drum at a first rotational speed of the carrier; and, pivot connection means for pivotally connecting the weights to the carrier to permit a pivoting movement of the weights into contact engagement with the drum for transmitting torque thereto from the carrier at rotational speeds higher than the first rotational speed.

The centrifugal weights each have a defined pivot axis as a consequence of the pivot connection with the carrier so that the centrifugal weights pivot outwardly away from their rest position into the coupling position when a predetermined rotational speed lying above the no-load speed is exceeded. Since the centrifugal weights are resiliently biased with respect to the carrier by the springs, they cannot pivot outwardly before the no-load speed is reached. As a consequence of the pivot connection and the biasing preload caused by the springs, the centrifugal weights can be arranged very close to the clutch drum without the occurrence of an undesired striking of the centrifugal weights against the clutch drum beneath a predetermined rotational speed.

BRIEF DESCRIPTION OF THE DRAWING

The invention will now be described with reference to the drawing wherein:

FIG. 4 is a side elevation view of one of the springs which applies a biasing preload to a centrifugal weight; and, FIG. 5 shows the spring of FIG. 4 viewed in the direction of arrow V of FIG. 4.

DESCRIPTION OF THE PREFERRED EMBODIMENTS OF THE INVENTION

Figure 1:
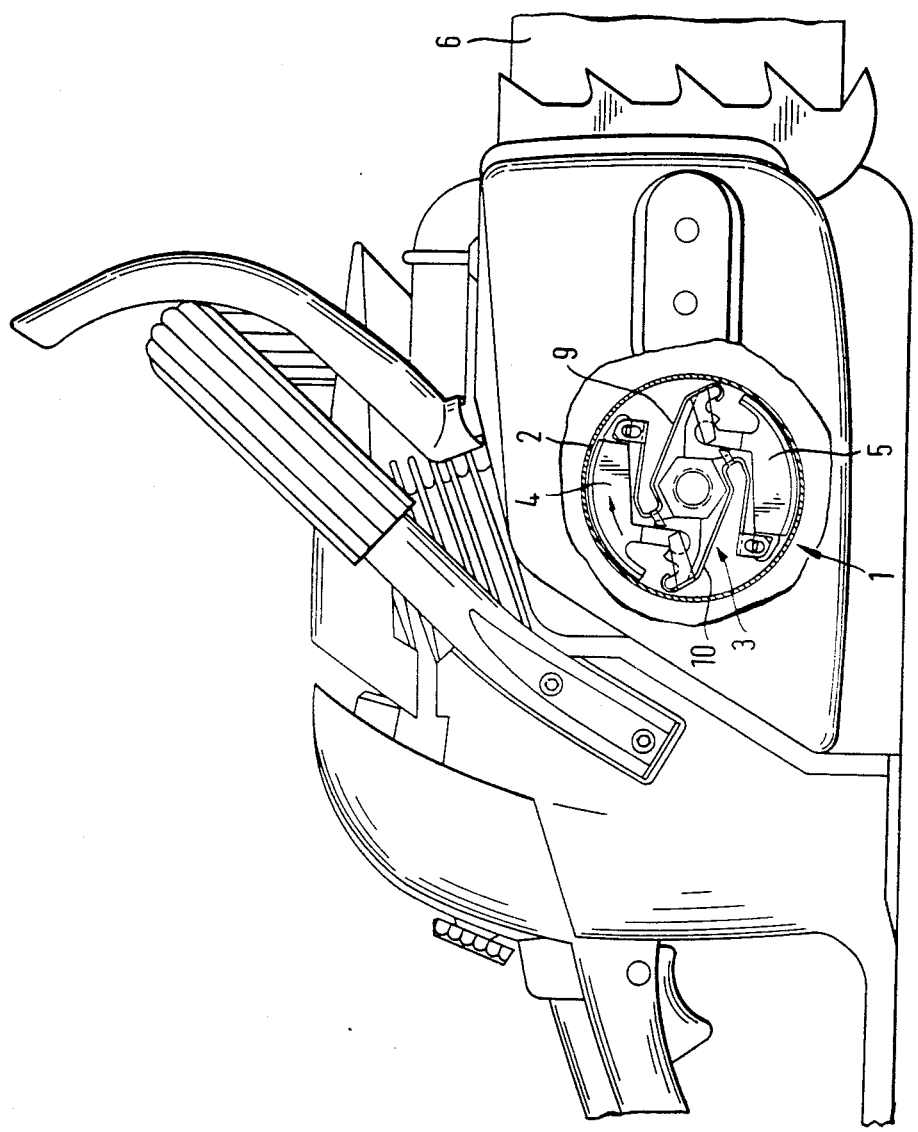
FIG. 1 is a side elevation view of a chain saw equipped with the centrifugal clutch according to the invention.

The centrifugal clutch which will be described in the following with respect to the drawing is disclosed in the context of a motor-driven chain saw. However, the centrifugal clutch can be used for other hand-guided apparatus such as lawn mowers and the like.

The chain saw according to FIG. 1 includes a centrifugal clutch 1 having a clutch drum 2 and a rotor 3 arranged inside the latter. This centrifugal clutch is preferably configured as a so-called servo-coupling. In servo-couplings, the friction occurring because of the gradual contact engagement of the centrifugal weights on the inner wall of the clutch drum is utilized for supporting the applied force. In this way, a relatively large torque can be transmitted by a low mass or by a small number of centrifugal weights.

The clutch drum 2 is fixedly connected for rotation with a sprocket 2b for driving a saw chain (not shown) along the periphery of a guide bar 6. The clutch drum is seated on the drive shaft of the motor of the chain saw so as to permit relative rotational movement with respect thereto. The rotor 3 is fixedly attached to the drive shaft of the motor so as to rotate therewith.

When a predetermined rotational speed of the drive shaft greater than the no-load speed is reached, the centrifugal clutch 1 is automatically engaged thereby coupling the saw chain to the drive shaft and driving the same. The engagement of the centrifugal clutch is obtained in that the centrifugal weights 4 and 5 of the rotor 3 are caused to move radially outwardly as a consequence of the increasing centrifugal force which is developed by increasing motor rotational speed. The centrifugal weights then lie form-tight against the clutch drum 2 so as to rotate the latter together with the sprocket 2b.

Figure 2:
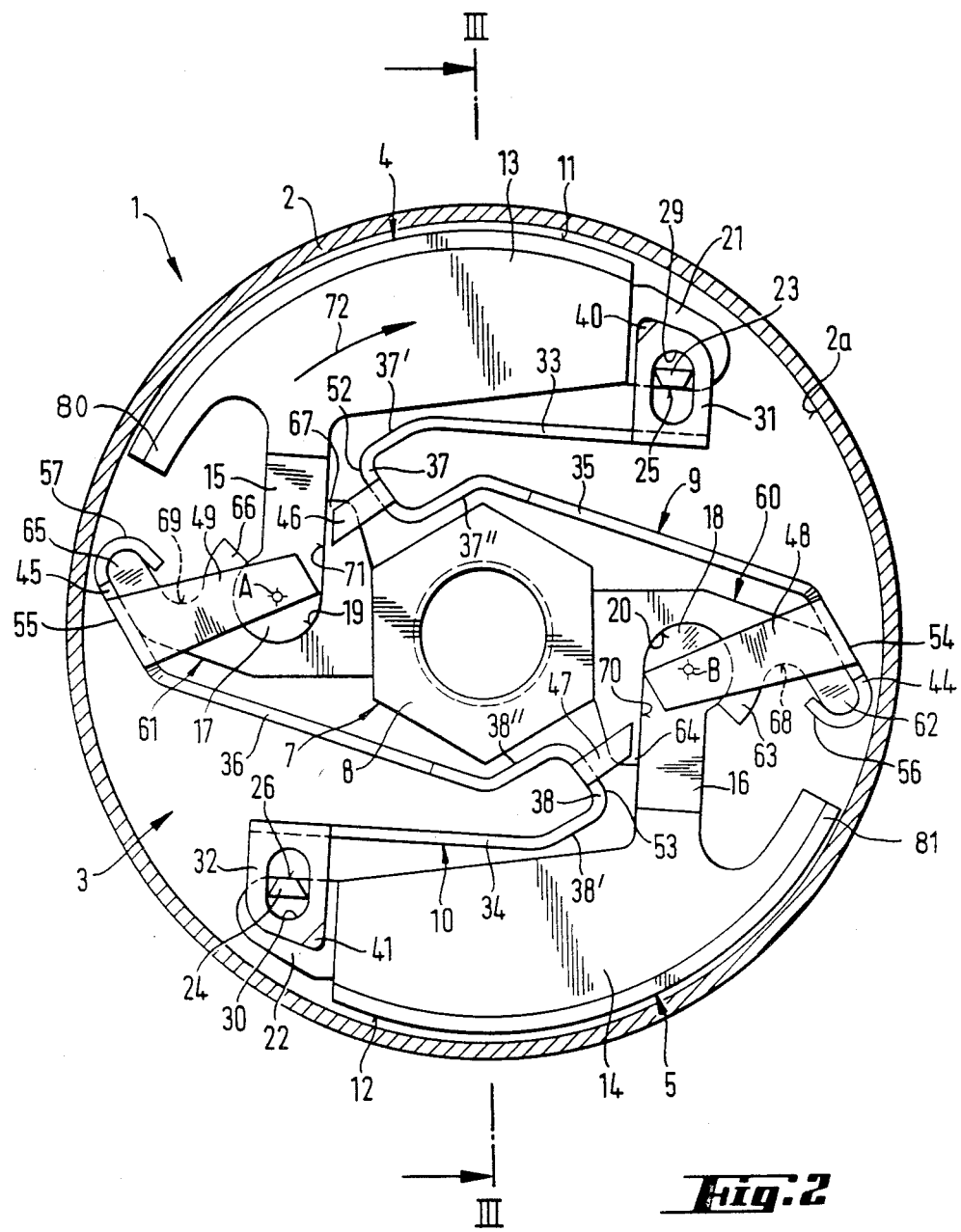
FIG. 2 is a side elevation view, partially in section, of the centrifugal clutch shown in FIG. 1.
Figure 3:
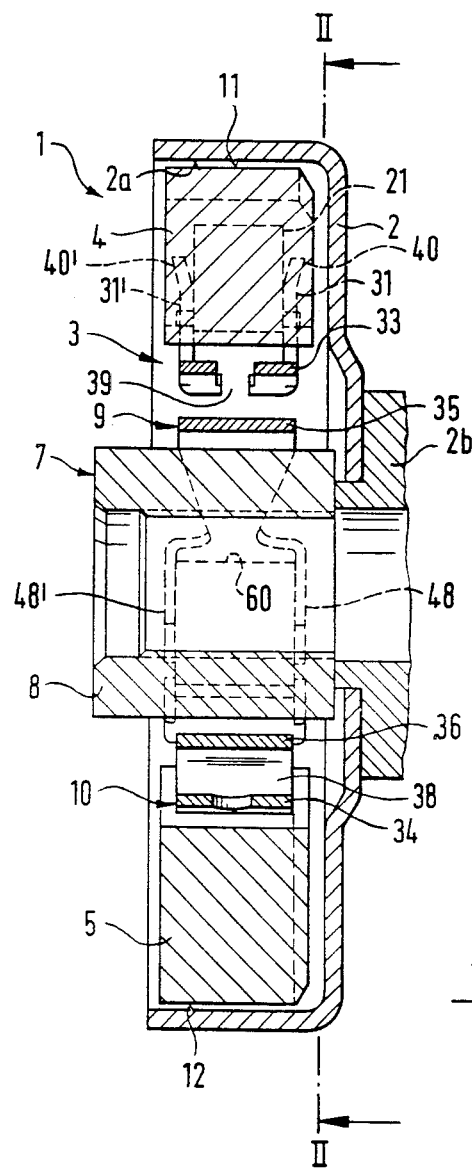
FIG. 3 is a section view taken along line III—III of FIG. 2.

FIGS. 2 and 3 show that the rotor 3 includes two centrifugal weights 4 and 5 having a shape approximating a segment of a circle. The rotor 3 further includes a carrier 7 having a central six-facet hub 8 and two hairpin-like springs 9 and 10 having like configurations. Spring 9 is shown in FIG. 5 so that the holding appendages on both sides thereof are shown; however, spring 10 can be seen in the drawing only from one side so that the appendages on only that side are shown.

The centrifugal weights 4 and 5 are identically configured and lie in different halves of the clutch drum in such a manner that their arcuate engaging surfaces 11 and 12 are directly adjacent to the inner wall 2a of the clutch drum 2. The engaging surfaces 11 and 12 of respective weights 4 and 5 correspond to circular segments when viewed in elevation.

The centrifugal weights 4 and 5 include respective connecting arms 15 and 16 which project transversely from near one end of the centrifugal weight bodies 13 and 14. When viewed in side elevation, the connecting arms 15, 16 have widened free ends defining a partially circular outline which preferably corresponds to three-fourths of a circle. These free ends 17 and 18 engage recesses 19 and 20, respectively, of the carrier 7 which too have a correspondingly circular outline thereby defining respective pivotal joints for the centrifugal weights 4 and 5. The free ends 17, 18 and the recesses 19, 20 conjointly define respective rotational joints having respective rotational axes A and B parallel to the axis of rotation of carrier 7. In this way, the centrifugal weights 4, 5 are provided with defined rotational axes. The centrifugal weights can therefore be arranged to have a small spacing to the inner wall 2a of the clutch drum 2 without the danger of the weights coming unintentionally into contact with the clutch drum at no-load speed. In connection with the configuration and mounting of the springs 9, 10 which will be described below, the pivot or rotational path of the centrifugal weights 4, 5 can be held very small without the centrifugal weights striking the clutch drum 2 at no-load speed as is the situation with known centrifugal clutches.

The centrifugal weights 4 and 5 have respective lugs 21, 22 projecting from the peripheral ends thereof pointing in the direction of rotation 72. The lugs 21, 22 have an approximately triangular shape and are of reduced cross section when viewed in the axial direction. The lugs 21, 22 include pins 23, 24 which project from respective sides thereof in the axial direction as shown in FIG. 2. The pins 23, 24 have an approximately trapezoidal outline. The smaller bases 25, 26 of respective pins 23, 24 face toward the axis of the clutch drum 2. The pins 23, 24 project into corresponding slotted insert openings 29, 30 of holding appendage pairs (31, 31'), 32 of the respective springs 9, 10. These holding appendage pairs (31, 31'), 32 laterally overlap the corresponding lugs 21, 22 of the centrifugal weights 4, 5 and are in contact engagement with the lugs so that substantially the entire side surfaces of the appendages are in full surface contact with the sides of the lugs. The springs 9, 10 secure the centrifugal weights 4, 5 with respect to the carrier 7.

The springs 9, 10 are configured to be identical and hold the centrifugal weights 4, 5 in a position which is resiliently biased with respect to the carrier 7 so that they are pivoted about their rotational joints (17, 19), (18, 20) to come into contact engagement with the clutch drum when the no-load rotational speed of approximately 2500 rpm is first exceeded. In this way, the situation is prevented wherein the centrifugal weights 4, 5 are already moved up to the inner wall 2a of the clutch drum 2 when the motor of the chain saw is at no-load speed. Otherwise, even in the presence of minor manufacturing and assembly tolerances, the centrifugal weights would strike against the clutch drum 2 and thereby cause disturbing noises.

The springs 9, 10 are preferably configured as leaf springs bent into an approximately hairpin-like shape. The springs can, however, also be of helical configuration. The springs 9, 10 have respective short spring legs 33, 34 and respective long spring legs 35, 36. The spring legs 33, 34 and 35, 36 extend outwardly from a U-shaped mid portion 37, 38 in the same direction so as to be approximately parallel to each other.

The holding appendages (31, 31'), 32 are provided at the free ends of the shorter legs 33, 34 of springs 9, 10 and extend perpendicularly away therefrom. As shown in FIG. 5 for spring 9, the holding appendages 31, 31' extend into parallel longitudinal edges 42 and 43 of the shorter leg 33 and extend parallel to the longitudinal center plane between the edges 42 and 43.

The springs 9, 10 are fastened to the centrifugal weights 4, 5 by pressing the holding appendages (31, 31'), 32 elastically apart so that the pins 23, 24 snap into the respective insert openings 29, 30 of the holding appendages. As mentioned above, substantially the entire side surfaces of the appendages of the appendage pairs (31, 31'), 32 are in full surface contact with the sides of the lugs; however, to prevent damage to the holding appendages (31, 31'), 32 when snapping the latter into place and to facilitate pushing the holding appendages onto the lugs 21, 22 of the centrifugal weights, the corners (40, 40'), 41 of holding appendages (31, 31'), 32 which face toward the clutch drum 2 and the centrifugal weight of bodies 13, 14 are bent outwardly in mutually opposite directions. The shorter legs 33, 34 of the springs 9, 10 are bifurcated over almost their entire length and define slot 39 as shown in FIG. 5 for spring 9. In this way, the springs 9, 10 have only a small spring constant; that is, the springs 9, 10 have a relatively intense elastic deformation without the yield point of the spring material being exceeded. Furthermore, the low spring constant achieves the effect that the force applied by the springs 9, 10 to the centrifugal weights 4, 5 remains approximately constant for changed working conditions.

The U-shaped mid portions 37, 38 each have slightly converging legs 37', 37" and 38', 38". The legs 37', 38' of the two mid portions 37, 38 define an obtuse angle with the shorter leg 33, 34 of the springs. The legs 37", 38" of the mid portions 37, 38 define obtuse angles with the longer legs 35, 36 which, in the unloaded condition of springs 9, 10, are parallel to the shorter legs 33, 34 as shown in FIG. 4. In the assembled condition as shown in FIG. 2, the legs 33, 35 and 34, 36 are elastically bent apart thereby applying a resilient biasing force to the centrifugal weights 4, 5. In this way, the centrifugal weights are loaded in the radially inward direction.

The longer legs 35, 36 of springs 9, 10 have approximately J-shaped ends 44, 45. The longer legs 54, 55 of the leg ends 44, 45 define obtuse angles with the spring legs 35, 36; whereas, the shorter legs 56, 57 of the leg ends 44, 45 define respective hooks. The legs 54 to 57 lie on the side of the longer spring leg 35, 36 facing away from the shorter spring leg 33, 34. The longer legs 54, 55 of the leg ends 44, 45 are provided with holding appendages (48, 48'), 49 extending in a direction perpendicularly away from the longitudinal edges. The holding appendages (48, 48'), 49 are disposed on the same side of the longer spring legs 45, 46 as are the hooks 56, 57 of the leg ends 44, 45. As shown in FIG. 5, the holding appendages 48, 48' are spaced apart a greater distance from each other than are the holding appendages 31, 31'.

Further holding appendages (46, 46'), 47 are provided on the respective transverse struts of the mid portions 37, 38 and extend in a direction opposite to legs 37', 37", 38', 38". The holding appendages (46, 46'), 47 are narrower and shorter than the holding appendages (31, 31'), 32 and (48, 48'), 49 and laterally overlap the carrier 7. In this way, the springs 9, 10 are axially fixed with respect to the carrier 7. The holding appendages (48, 48'), 49 are longer than the holding appendages (31, 31'), 32 and likewise laterally overlap the carrier 7 and extend up to the rotational joints 17, 19 and 18, 20. In this way, the centrifugal weights 4, 5 are not only axially secured by holding appendages (31, 31'), 32 but are also axially secured by holding appendages (48, 48'), 49. The holding appendages (46, 46'), 47 and (48, 48'), 49 lie flat against the carrier 7 and the centrifugal weights 4, 5, respectively. The holding appendages (48, 48'), 49 are configured so as to be trapezoidally tapered in the direction toward their free ends. In the connection region on the legs 54, 55, the widths of the holding appendages (48, 48'), 49 correspond approximately to the length of the legs 54, 55. The holding appendages (48, 48'), 49 extend approximately in the same direction as the holding appendages (46, 46'), 47'.

The hooks 56, 57 of the leg ends 44, 45 overlap the projections 62, 65 of the carrier 7 at the respective end faces thereof.

The springs 9, 10 and the centrifugal weights 4, 5 are arranged on respective sides of the carrier so as to be approximately mirror symmetrical to the radial plane of the carrier 7. The springs 9, 10 are connected with centrifugal weights 4, 5 via the holding appendages (31, 31'), 32 and the hooks 56, 57. The pins 23, 24 corresponding to the holding appendages (31, 31'), 32 and the projections 62, 65 of the carrier 7 corresponding to the hooks 56, 57 are so arranged that the springs 9, 10 are elastically deformed in the assembled centrifugal clutch so that they exert a preload on the centrifugal weights 4, 5.

The leg ends 44, 45 of the spring legs 35, 36 are the same width as the shorter spring legs 33, 34 and the mid portions 37, 38; whereas, the remaining portion of the longer spring legs 35, 36 is tapered in the direction of the leg ends 44, 45 and has correspondingly converging longitudinal edge portions 58, 59. This bulge likewise contributes to reducing the spring constant.

The holding appendages (48, 48'), 49 axially overlap carrier arms 60, 61 which project approximately radially from the hub 8 and lie approximately diametrically opposite each other. The carrier arm 60 has three projections (62, 63, 64) which are disposed one behind the other when viewed in the longitudinal direction of the arm and which extend transversely to the carrier arm. The carrier arm 61 has three corresponding projections (65, 66, 67). The projections 64, 67 which extend directly at the hub 8 and the neighboring mid projections 63, 66 bound the recesses 19, 20 for receiving the ends 17, 18 of the arms of the centrifugal weights 4, 5. The mid projections 63, 66 and the outer projections 62, 65 conjointly define the recesses 68, 69 in which the hooks 56, 57 of the spring leg ends 44, 45 project.

The outer and mid legs 62, 65 and 63, 66 are approximately the same length; however, all are shorter than the inner projections 64, 67. The inner projections 64, 67 extend perpendicularly to the longitudinal direction of the carrier arms 60, 61; whereas, the other legs 62, 65 extend diagonally outwardly and projections 63, 66 curve inwardly so as to be inclined in the direction of the hub 8.

Outer surfaces 70, 71 of the inner projections 64, 67 facing away from the hub 8 define an abutment for the centrifugal weights 4, 5 when the latter are in their decoupled or rest position. The centrifugal weights 4, 5 abut against the abutment surfaces 70, 71 with their connecting arms 15, 16. With the aid of this abutment, the rotational path of the centrifugal weights 4, 5 is limited in the inward direction toward the carrier 7. The connecting arms 15, 16 are spaced from the mid projections 63, 66 at a distance sufficient to permit the centrifugal weights 4, 5 to rotate about their rotational axes A, B so as to come with their contact surfaces 11, 12 into full and complete surface contact with the inner wall 2a of the clutch drum 2.

If the motor is running at no-load, the centrifugal weights 4, 5 are spaced from the clutch drum 2. As a consequence of the preloading, the springs 9, 10 pull the centrifugal weights 4, 5 tightly against the abutment surfaces 70, 71 of the carrier arms 60, 61. This preload force is applied via the holding appendages (31, 31'), 32 and the pins 23, 24 of the centrifugal weights 4, 5. The preload force is so adjusted that the centrifugal force acting upon the centrifugal weights 4, 5 is greater than the preload force of the springs 9, 10 when a predetermined rotational speed of the motor drive shaft is reached. The centrifugal weights 4, 5 then pivot outwardly about the rotational axes A, B. The centrifugal weights are so mounted that they at first only lie against the inner wall 2a of the clutch drum with their ends 80, 81 lying to the rear when viewed in the direction of rotation 72. The centrifugal weights 4, 5 are mounted on the carrier arms 60, 61, respectively, so as to cause the contact engaging surfaces 11, 12 to be non-concentric with the inner wall 2a of the clutch drum. As the rotational speed increases, the centrifugal weights 4, 5 come into contact engagement with the inner wall 2a with more and more of their respective contact engaging surfaces 11 and 12 until the entire contact engaging surfaces of the weights are in contact engagement with the inner wall. This ever increasing surface contact of the centrifugal weights with the inner wall 2a is supported by the friction between that portion of the contact engaging surfaces 11, 12 already in contact with the inner wall 2a By means of this servo-effect, a soft coupling of the clutch drum to the rotor is achieved. As soon as the instantaneous rotational speed drops below a predetermined value, the return force of the springs 9, 10 overcomes the centrifugal force so that the centrifugal weights 4, 5 pivot inwardly toward their rest position.

The rotor 3 described above can be assembled quickly and simply without tools since the centrifugal weights 4, 5 with their connecting arms 15, 16 need only be inserted in the corresponding recesses 19, 20 and the springs 9, 10 with their holding appendages (31, 31'), 32; (46, 46'), 47 and (48, 48'), 49 must only be connected respectively to the lugs 21, 22, the free ends of the inner projections 64, 67 and the carrier arms 60 and 61. Finally, the hooks 56, 57 must be placed on the outer projections 62, 65 and the holding appendages (31, 31') and 32 must be hung into the pins 23, 24.

It is understood that the foregoing description is that of the preferred embodiments of the invention and that various changes and modifications may be made thereto without departing from the spirit and scope of the invention as defined in the appended claims.

What is claimed is:

1. A centrifugal clutch for hand-guided, portable, motor-driven apparatus including chain saws or the like, the centrifugal clutch comprising:
   a carrier adapted to be rotatably driven by the motor of the apparatus;
   a clutch drum disposed in surrounding relationship to said carrier;
   at least two centrifugal weights disposed within said clutch drum and mounted on said carrier;
   resilient means for resiliently biasing said weights radially inwardly toward said carrier so as to hold said weights in a rest position whereat said weights are disengaged from said drum up to a first rotational speed of said carrier; and,
   pivot connection means for pivotally connecting said weights to said carrier to permit a pivoting movement of said weights into contact engagement with said drum for transmitting torque thereto from said carrier at rotational speeds higher than said first rotational speed;
   said resilient means including springs connecting respective ones of said weights to said carrier;
   said pivot means comprising two articulated joints corresponding to respective ones of said weights, each one of said articulated joints including mutually engageable joint parts of which one joint part is insertable into the other joint part;
   each of said springs including first holding means for connecting the spring to the centrifugal weight corresponding thereto and second holding means for connecting the spring to the carrier;
   said first holding means including: a pin formed on said weight; and, appendage means formed on said spring and having aperture means formed therein, said appendage means being resilient so as to permit elastically deforming the same by pressing said appendage means over said pin thereby causing the latter to engage said aperture means as said appendage means snaps into place over said pin.

2. The centrifugal clutch of claim 1, each of said springs further including third holding means for securing the spring axially with respect to said carrier.

3. The centrifugal clutch of claim 1, each of said springs having two ends, said appendage means being formed on one of said ends; said second holding means including: a projection formed on said carrier; and, a hook-shaped end portion formed on the other one of the ends of said spring for engaging said projection thereby connecting the spring to the carrier.

4. A centrifugal clutch for hand-guided, portable, motor-driven apparatus including chain saws or the like, the centrifugal clutch comprising:
   a carrier adapted to be rotatably driven by the motor of the apparatus;
   a clutch drum disposed in surrounding relationship to said carrier;
   at least two centrifugal weights disposed within said clutch drum and mounted on said carrier;
   resilient means for resiliently biasing said weights radially inwardly toward said carrier so as to hold said weights in a rest position whereat said weights are disengaged from said drum up to a first rotational speed of said carrier; and,
   pivot connection means for pivotally connecting said weights to said carrier to permit a pivoting movement of said weights into contact engagement with said drum for transmitting torque thereto from said carrier at rotational speeds higher than said first rotational speed;
   said resilient means including springs connecting repective ones of said weights to said carrier;
   said pivot means comprising two articulated joints corresponding to respective ones of said weights, each one of said articulated joints including mutually engageable joint parts of which one joint part is insertable into the other joint part;
   each of said springs including first holding means for connecting the spring to the centrifugal weight corresponding thereto and second holding means for connecting the spring to the carrier;
   said first holding means including: pin means formed on the weight; and, a pair of mutually parallel holding appendages formed on said spring and having respective insert openings for engaging said pin means, said appendages being resilient so as to permit pressing said appendages elastically apart so that said pin means engages said insert openings when said appendages are pressed onto said pin means.

5. The centrifugal clutch of claim 4, said pin means being a pair of pins each having an approximately trapezoidally-shaped cross section, said pins being mounted on the weight so as to cause the wider base of the trapezoidal cross section to face toward said clutch drum.

6. The centrifugal clutch of claim 4 each of said weights having an end portion facing into the direction of rotation of said carrier, said pin means being mounted on said end portion of said weight.

7. The centrifugal clutch of claim 6, said end portion having a thickness less than the remainder of said weight.

8. A centrifugal clutch for hand-guided, portable, motor-driven apparatus including chain saws or the like, the centrifugal clutch comprising:
   a carrier adapted to be rotatably driven by the motor of the apparatus;
   a clutch drum disposed in surrounding relationship to said carrier;
   at least two centrifugal weights disposed within said clutch drum and mounted on said carrier;
   resilient means for resiliently biasing said weights radially inwardly toward said carrier so as to hold said weights in a rest position whereat said weights are disengaged from said drum up to a first rotational speed of said carrier; and,
   pivot connection means for pivotally connecting said weights to said carrier to permit a pivoting movement of said weights into contact engagement with said drum for transmitting torque thereto from said carrier at rotational speeds higher than said first rotational speed;
   said resilient means including springs connecting respective ones of said weights to said carrier;
   said pivot means comprising two articulated joints corresponding to respective ones of said weights, each one of said articulated joints including mutually engageable joint parts of which one joint part is insertable into the other joint part;

each of said springs including first holding means for connecting the spring to the centrifugal weight corresponding thereto and second holding means for connecting the spring to the carrier;

said carrier having a hub and at least two carrier arms, said carrier arms corresponding to respective ones of said weights, said carrier arms extending approximately radially from said hub for accommodating said pivot connection means;

each of said second holding means including: an outer projection extending from a corresponding one of said carrier arms; and, a J-shaped end portion formed on one end of the spring, said J-shaped end portion defining a hook for engaging said outer projection thereby connecting the spring to the carrier arm.

9. The centrifugal clutch of claim 8, said carrier arms being of like configuration.

10. The centrifugal clutch of claim 8, each of said springs being configured to have a hairpin-like shape having legs of different length.

11. The centrifugal clutch of claim 10, said J-shaped end portion being formed on the end of the longer one of said legs, said longer leg being tapered to said J-shaped end portion.

12. The centrifugal clutch of claim 11, said first holding means being formed at the end of the shorter leg of said spring.

13. The centrifugal clutch of claim 12, at least the shorter one of said legs being bifurcated.

14. A centrifugal clutch for hand-guided, portable, motor-driven apparatus including chain saws or the like, the centrifugal clutch comprising:

a carrier adapted to be rotatably driven by the motor of the apparatus;

a clutch drum disposed in surrounding relationship to said carrier;

at least two centrifugal weights disposed within said clutch drum and mounted on said carrier;

resilient means for resiliently biasing said weights radially inwardly toward said carrier so as to hold said weights in a rest position whereat said weights are disengaged from said drum up to a first rotational speed of said carrier; and, pivot connection means for pivotally connecting said weights to said carrier to permit a pivoting movement of said weights into contact engagement with said drum for transmitting torque thereto from said carrier at rotational speeds higher than said first rotational speed;

said resilient means including springs connecting respective ones of said weights to said carrier;

said pivot means comprising two articulated joints corresponding to respective ones of said weights, each one of said articulated joints including mutually engageable joint parts of which one joint part is insertable into the other joint part;

each of said springs including first holding means for connecting the spring to the centrifugal weight corresponding thereto and second holding means for connecting the spring to the carrier;

each of said springs further including third holding means for securing the spring axially with respect to said carrier; and, said second holding means being adapted to also axially secure the centrifugal weight corresponding to the spring.

15. A centrifugal clutch for hand-guided, portable, motor-driven apparatus including chain saws or the like, the centrifugal clutch comprising:

a carrier adapted to be rotatably driven by the motor of the apparatus;

a clutch drum disposed in surrounding relationship to said carrier;

at least two centrifugal weights disposed within said clutch drum and mounted on said carrier;

resilient means for resiliently biasing said weights radially inwardly toward said carrier so as to hold said weights in a rest position whereat said weights are disengaged from said drum up to a first rotational speed of said carrier; and, pivot connection means for pivotally connecting said weights to said carrier to permit a pivoting movement of said weights into contact engagement with said drum for transmitting torque thereto from said carrier at rotational speeds higher than said first rotational speed;

said resilient means including springs connecting respective ones of said weights to said carrier;

said pivot means comprising two articulated joints corresponding to respective ones of said weights, each one of said articulated joints including mutually engageable joint parts of which one joint part is insertable into the other joint part;

each of said springs including first holding means for connecting the spring to the centrifugal weight corresponding thereto and second holding means for connecting the spring to the carrier;

each of said springs further including third holding means for securing the spring axially with respect to said carrier; and, each of said springs having two ends and a mid region disposed therebetween, said first holding means being located at one of the ends of the spring and said second holding means being located at the other one of the ends of the spring, said third holding means being disposed at the mid region of the spring.

16. The centrifugal clutch of claim 15, said first holding means including holding appendages adapted to axially secure the centrifugal weight.

17. The centrifugal clutch of claim 16, said second holding means including holding appendages extending outwardly from the spring for axially securing the spring and the centrifugal weight corresponding thereto with respect to said carrier; and, said third holding means including holding appendages extending therefrom for axially securing the spring with respect to said carrier.

18. A centrifugal clutch for hand-guided, portable, motor-driven apparatus including chain saws or the like, the centrifugal clutch comprising:

a carrier adapted to be rotatably driven by the motor of the apparatus;

a clutch drum disposed in surrounding relationship to said carrier;

at least two centrifugal weights disposed within said clutch drum and mounted on said carrier;

resilient means for resiliently biasing said weights radially inwardly toward said carrier so as to hold said weights in a rest position whereat said weights are disengaged from said drum up to a first rotational speed of said carrier; and, pivot connection means for pivotally connecting said weights to said carrier to permit a pivoting movement of said weights into contact engagement with said drum for transmitting torque thereto from said carrier at rotational speeds higher than said first rotational speed;

said resilient means including springs connecting respective ones of said weights to said carrier;

said pivot means comprising two articulated joints corresponding to respective ones of said weights, each one of said articulated joints including mutually engageable joint parts of which one joint part is insertable into the other joint part;

each of said springs including first holding means for connecting the spring to the centrifugal weight corresponding thereto and second holding means for connecting the spring to the carrier;

said carrier having a hub and at least two carrier arms, said carrier arms corresponding to respective ones of said weights and being of like configuration, said carrier arms extending approximately radially from said hub, each of said arms having an inner projection and a mid projection extending transversely therefrom for conjointly defining said other joint part of a corresponding one of said articulated joints.

19. The centrifugal clutch of claim 18, said second holding means of each of said springs including an outer projection formed on a corresponding one of said carrier arms and, a hook formed on one end of the spring for engaging said outer projection thereby connecting the spring to the carrier arm.

20. The centrifugal clutch of claim 19, said inner projection being longer than said mid projection and said outer projection.

21. The centrifugal clutch of claim 18, said other joint part being a recess defining an outline corresponding to a part of the circumference of a circle, said one part of said one joint being a connecting arm extending outwardly from the corresponding centrifugal weight, said connecting arm having a widened free end defining an outline likewise corresponding to a part of the circumference of a circle and being adapted to fit into said recess for pivotal movement therein.

* * * * *